United States Patent [19]

Yang et al.

[11] Patent Number: 5,202,392
[45] Date of Patent: Apr. 13, 1993

[54] BLEND OF A POLYESTER AND A POLYCARBONATE

[75] Inventors: Hsinjin Yang, Fairport; Daniel Y. Paul, Rochester, both of N.Y.

[73] Assignee: Eastman Kodak Company, Rochester, N.Y.

[21] Appl. No.: 748,489

[22] Filed: Aug. 22, 1991

[51] Int. Cl.$^5$ .................. C08L 69/00; C08L 67/03
[52] U.S. Cl. ........................... 525/439; 525/466
[58] Field of Search .............. 525/439, 466; 528/201

[56] References Cited

U.S. PATENT DOCUMENTS

| | | | |
|---|---|---|---|
| 3,317,466 | 5/1967 | Caldwell | 528/201 |
| 4,286,075 | 8/1981 | Robeson et al. | 525/439 |
| 4,379,892 | 4/1983 | Ueno et al. | 525/439 |
| 4,533,702 | 8/1985 | Freitag | 525/439 |
| 4,654,411 | 3/1987 | Serini | 528/194 |
| 4,822,382 | 4/1989 | Nelson | 428/394 |
| 4,840,861 | 6/1989 | Staudenmayer et al. | 430/59 |

FOREIGN PATENT DOCUMENTS 62-247374  10/1987  Japan .

*Primary Examiner*—David J. Buttner
*Attorney, Agent, or Firm*—David F. Janci

[57] ABSTRACT

A polymeric blend comprising a polyester and a polycarbonate, wherein:
the polyester contains recurring units having the structure

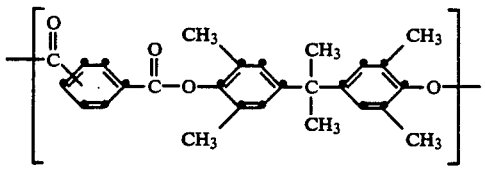

and the polycarbonate contains recurring units having the structure

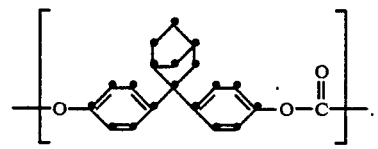

6 Claims, No Drawings

BLEND OF A POLYESTER AND A POLYCARBONATE

FIELD OF THE INVENTION

This invention relates to a blend of a polyester and a polycarbonate and, more particularly, to such a blend wherein the polyester and the polycarbonate are very compatible; i.e., the polyester and the polycarbonate can form a solid solution with each other.

BACKGROUND

Polycarbonates are well known and widely used engineering thermoplastics having utility for producing molded articles and protective plastic overcoats. They are known to exhibit good hardness, good impact resistance, and, in their amorphous higher molecular weight forms, good transparency. However, polycarbonates have drawbacks for some applications. namely, poor resistance to stress cracking caused by contact with solvents such as gasoline or other chemicals, and, in their lower molecular weight forms, a tendency to crystallize and thereby become hazy rather than transparent.

In contrast, some thermoplastic polyesters, while not having as high impact resistance as polycarbonates, have excellent resistance to stress cracking caused by contact with solvents or other chemicals, and good amorphousness and transparency over a wider range of molecular weights.

It would be desirable to be able to provide a polymeric composition, for example by blending a polyester with a polycarbonate, that would provide a combination of the beneficial properties of both the polyester and the polycarbonate, e.g., good hardness, high impact resistance, high transparency, good resistance to chemical-caused stress cracking, and relatively reasonable cost. Unfortunately, these goals have been thwarted in the past by the inherent incompatibilities of many polyesters and polycarbonates. By "incompatibility", we mean the inability of the two polymers to form and/or maintain a solid solution with each other over a wide range of proportions and external conditions. Incompatibility of a blend of two or more polymers is evidenced by the blend's having more than one glass transition temperature (Tg), which is a reliable indicator that the polymers in the blend exist in separate phases, each exhibiting properties different from each other, rather than the single set of properties exhibited by a blend of compatible polymers that form a solid solution with each other, i.e., form a single phase in the blend. Inherent drawbacks of phase separations between the polymers in a blend include: inability to provide a single Tg, poorer structural integrity, poorer resistance to impact and other stress, poorer resistance to cracking caused by chemical attack, and poorer transparency due to light scattering, all of which are contrary to the purposes intended in creating the blend.

Thus, a need exists for a blend of a polyester and a polycarbonate, wherein the blended polymers are compatible with each other over a wide range of proportions, and wherein the blend exhibits good amorphousness and transparency, good impact resistance, a single Tg, better resistance to chemically caused stress cracking than that of the polycarbonate itself, and reasonable cost.

SUMMARY OF THE INVENTION

The present invention satisfies the above-noted need by providing a polymeric blend comprising a polyester and a polycarbonate, wherein:

the polyester contains recurring units having the structure

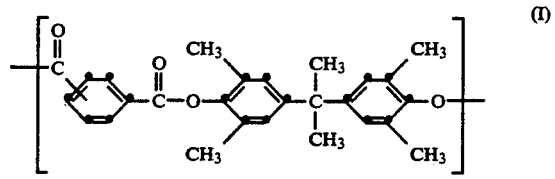

and the polycarbonate contains recurring units having the structure

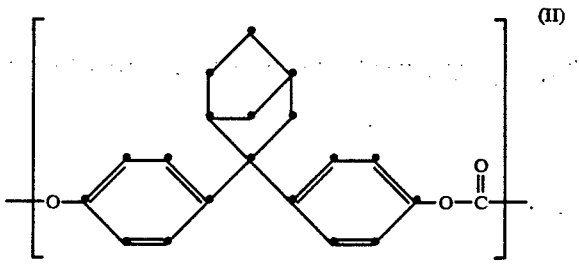

The polyester and polycarbonate in the blend of this invention are very compatible with each other; they form a solid solution with each other when combined in any proportions. The blend exhibits a single Tg, good amorphousness and transparency over a wide range of molecular weights of both polymers in the blend, good impact resistance, and better resistance to chemically caused stress cracking than that of the polycarbonate itself. The blend can be obtained at resonable cost, and has utility for producing molded or cast articles and protective overcoats.

DESCRIPTION OF PREFERRED EMBODIMENTS

The polymers having recurring units of structure (II) employed in the blends of this invention are known polycarbonates and can be prepared by any of the methods well known in the art for synthesizing such polycarbonates, e.g., by condensation of appropriate bisphenols with phosgene. For example, an appropriate bisphenol is 4,4'-(2-norbornylidene)bisphenol, which can be prepared by reaction of 2-norbornanone with molten phenol in concentrated hydrochloric acid in the presence of methyl mercaptan. Further details of preparation of a Structure (II) polycarbonate are presented in Preparation 1, below. Structure (II) polycarbonates having weight average molecular weights within the range of from 10,000 to 200,000 are useful in accordance with the invention.

Structure (I), illustrated above to describe recurring units contained in the polyester employed in a blend in accordance with the invention, is intended to encompass the following alternative isomeric Structures (I-A) and (I-B):

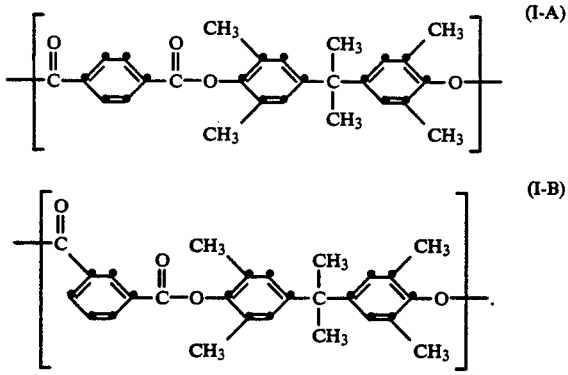

The polyester in a blend of the invention can contain recurring units having Structure (I-A), recurring units having Structure (I-B), or recurring units having Structure (I-A) and recurring units having Structure (I-B). All three alternatives serve the purposes of the invention well. In a preferred embodiment of the invention the polyester contains recurring units having Structure (I-A).

The polyesters having recurring units of structure (I) employed in blends of this invention can be prepared by methods generally known to be useful for polyester syntheses, e.g., by condensation of appropriate diacids (or their esters or salts) with appropriate diols. For example, appropriate diacid salts are terephthaloyl chloride and isophthaloyl chloride, which are readily commercially available, e.g., from the Eastman Kodak Co., USA. An appropriate diol is tetramethylbisphenol A, which can be prepared by condensation of 2,6-dimethylphenol with acetone. Further details of preparations of the diol and appropriate polyesters are presented in Preparations 2-7, below. Polyesters having recurring units of Structure (I), that are useful in accordance with the invention, have weight average molecular weights within the range of from 10,000 to 200,000.

Blends in accordance with the invention contain the polyester and the polycarbonate in any desired proportions, so long as each is present in greater than zero amount. The particular proportions chosen will depend upon the particular balance of properties desired. However, whatever proportions are chosen, it has been unexpectedly found that the polycarbonate having recurring units of structure (II) is fully compatible with the polyester having recurring units of structure (I); i.e., the polyester and polycarbonate can be blended in any proportions to form a solid solution having a single phase and a single Tg.

Blends of this invention can be formed by any means well known in the art for preparing a solid solution of different polymers. For example, the polymers can be dissolved and well-mixed in any solvent in which both polymers are fully soluble (e.g., dichloromethane) followed by drying off the solvent (to produce the blend in bulk), or mixing the solution with a liquid in which the polymers are not soluble (to precipitate the blend in particulate form), or followed by solvent-coating a layer of the solution onto a substrate and then drying off the solvent to form an overcoat film of the blend on the substrate, which can remain on the substrate as a permanent overcoat or be peeled off the substrate to form a free-standing film. Alternatively, for example, the polymers can be physically melt-blended in any suitable device (e.g., an extruder) at a temperature high enough to allow easy flow and thorough mixing of both polymers, followed by cooling in bulk or chopped pellet form or melt-coating a layer or molding into a desired shape and then cooling. The method of blending is not critical, so long as it enables thorough mixing and the formation of a solid solution.

The following preparations and examples are presented to further illustrate some blends in accordance with the invention and to compare their properties to those of blends or single polymers outside the scope of the invention.

A polycarbonate containing recurring units having Structure (II) was synthesized as described in Preparation 1, below.

Polyesters containing recurring units having Structure (I) were synthesized as described in Preparations 2-7, below.

PREPARATION 1

4,4'-(2-Norbornylidene)bisphenol polycarbonate, Structure (II)

A 500 ml three-necked flask equipped with a stirrer, a thermometer, a wide-bore gas inlet tube, and a gas outlet was charged with 4,4'-(2-norbornylidene)bisphenol (0.1 mole), pyridine (32 g), and methylene chloride (250 ml). Gaseous phosgene was passed into the rapidly stirred reaction mixture, which was maintained at 25°-30° C. with a water bath. Pyridine hydrochloride began to separate from the reaction mixture after about 25 minutes. Approximately 15 minutes later a marked increase in visosity was noted over a period of 2-3 minutes; the polymerization was then essentially completed. The flask was then vented with nitrogen to a phosgene trap, and 100 ml of water and 100 ml of methylene chloride were added immediately. The mixture was stirred 1 hour then neutralized with dilute hydrochloric acid, 2% (200 ml) followed by water (5×200 ml). The polymer solution was vigorously stirred and precipitated as soft particles by adding acetone (500 ml). The particles were hardened with 1 liter of methanol, filtered, washed with methanol, then water, and vacuum dried at 70° C. The polymer yield was 65% of the desired product.

Weight average molecular weight (by gel permeation chromatography based on polystyrene equivalents)=88,200.

Glass transition temperature (by differential scanning calorimetry)=228° C.

PREPARATION 2

Tetramethylbisphenol A

In a 1-liter 3-necked round-bottom flask equipped with a condenser, stirrer and HCl gas inlet tube, were placed 244 g (2.0 mol) of 2,6-dimethylphenol and 116 g (2.0 mol) of reagent grade acetone. HCl gas was then bubbled into the reaction mixture for approximately 5 hours (i.e., until the mixture was saturated with HCl). The reaction mixture was stirred at room temperature for 24 hours, and the solids were filtered and washed twice with 1 liter of hexanes, followed by 1 liter of distilled water, then again with hexanes. The crude product was recrystallized from 1.5 liters of 80% aqueous methanol, collected, and dried in a vacuum oven at 50° C. for 24 hours to give 185 g (65%) of the desired product as white crystals.

Melting point=164° C.

Elemental Analysis: calculated for $C_{19}H_{24}O_2$: 80.2% C, 8.5% H; found: 80.2% C, 8.5% H.

PREPARATION 3

Poly(tetramethylbisphenol A terephthalate), Structure (I-A)

To a stirred mixture of tetramethylbisphenol A (28.44 g, 0.10 mol) and triethylamine (22.3 g, 0.22 mol) in methylene chloride (200 ml) at 10° C. was added a solution of terephthaloyl chloride (20.3 g, 0.10 mol) in methylene chloride (100 ml). After addition, the temperature was allowed to rise to room temperature, and the solution was stirred under nitrogen for 4 hours, during which triethylamine hydrochloride precipitated in a gelatinous form and the solution became viscous. The solution was then filtered and washed with dilute hydrochloric acid, 2% (100 ml) followed by water (3×200 ml). The solution was then poured into methanol with vigorous stirring, and a white fibrous polymer, the desired product, precipitated. The isolated polymer was dried in a vacuum oven at 40° C. for 24 hours.

Weight average molecular weight=34,800.
Number average molecular weight=14,200.

(Molecular weights were determined by gel permeation chromatography based on polystyrene equivalents.) Glass transition temperature (by differential scanning calorimetry)=210° C.

PREPARATION 4

Poly(tetramethylbisphenol A isophthalate), Structure (I-B)

The title polyester was prepared in the same manner as described in Preparation 3, except that isophthaloyl chloride was employed, instead of terephthaloyl chloride.

Weight average molecular weight=14,900.
Number average molecular weight=3,200.
Glass transition temperature=154° C.

PREPARATION 5

Poly(tetramethylbisphenol A terephthalate-co-isophthalate), Structures (I-A) and (I-B) (75:25 molar ratio)

The title polyester was prepared in the same manner as described in Preparation 3, except that instead of the 20.3 g (0.10 mole) of terephthaloyl chloride, there were employed 15.225 g (0.075 mole) of terephthaloyl chloride and 5.075 g (0.025 mole) of isophthaloyl chloride. The yield was 89% (37 g) of the title polyester.

Weight average molecular weight=43,400.
Number average molecular weight=18,200.
Glass transition temperature=211° C.

PREPARATION 6

Poly(tetramethylbisphenol A terephthalate-co-isophthalate), Structures (I-A) and (I-B) (50:50 molar ratio)

The title polyester was prepared in the same manner as described in Preparation 3, except that instead of the 20.3 g (0.10 mole) of terephthaloyl chloride, there were employed 10.15 g (0.05 mole) of terephthaloyl chloride and 10.15 g (0.05 mole) of isophthaloyl chloride. The yield was 94% (39 g) of the title polyester.

Weight average molecular weight=29,000.
Number average molecular weight=10,300.
Glass transition temperature=197° C.

PREPARATION 7

Poly(tetramethylbisphenol A terephthalate-co-isophthalate). Structures (I-A) and (I-B) (25:75 molar ratio)

The title polyester was prepared in the same manner as described in Preparation 3, except that instead of the 20.3 g (0.10 mole) of terephthaloyl chloride, there were employed 5.075 g (0.025 mole) of terephthaloyl chloride and 15.225 g (0.075 mole) of isophthaloyl chloride. The yield was 80% (33 g) of the title polyester.

Weight average molecular weight=35,300.
Number average molecular weight=13,000.
Glass transition temperature=187° C.

EXAMPLES 1-3

Blends in accordance with the invention were prepared by thoroughly dissolving and mixing in dichloromethane various proportions of Structure (II) polycarbonate (prepared in accordance with Preparation 1, above), and the polyester of Structure (I-A) (prepared in accordance with Preparations 2 and 3, above), solvent casting the various solutions, and then drying off the solvent to yield free-standing films of the blends.

Each of the blends of Examples 1-3 exhibited good amorphousness and transparency, good impact resistance, better resistance to chemically caused stress cracking than that of the Structure II polycarbonate itself, and a single Tg (determined by differential scanning calorimetry).

For purposes of comparison, control films outside the scope of the invention were prepared as in Examples 1-3, except that Control A was composed of 100% of the Structure II polycarbonate, Control B was composed of 100% of the Structure (I) polyester employed in Examples 1-3, and Control C was composed of a 50:50 weight ratio blend of the Structure II polycarbonate and a polyester formed from 2,2-bis(4-hydroxyphenyl)propane and terephthalic:isophthalic acids (55:45 molar ratio) (a polyester sold under the trademark, Ardel D-100, by Amoco, Inc., USA). The Control C film had a hazy visual appearance (i.e., poor transparency) and exhibited two separate Tg's (determined by differential scanning calorimetry), which indicates that the polymers in the blend were incompatible and formed separate phases.

Relevant data is presented in Table I, below.

TABLE I

| Example | Weight Ratio (polyester:polycarbonate) | Tg('s) (°C.) |
|---|---|---|
| Control A | 0:100 | 228 |
| 1 | 25:75 | 224 |
| 2 | 50:50 | 223 |
| 3 | 75:25 | 218 |
| Control B | 100:0 | 210 |
| Control C | 50:50 | 196 and 224 |

EXAMPLES 4-6

Blends in accordance with the invention were prepared by thoroughly dissolving and mixing in dichloromethane various proportions of Structure (II) polycarbonate (prepared in accordance with Preparation 1, above), and the polyester of Structure (I-B) (prepared in accordance with Preparations 2 and 4 above), solvent casting the various solutions, and then drying off the solvent to yield free-standing films of the blends.

Each of the blends of Examples 4-6 exhibited good amorphousness and transparency, good impact resistance, better resistance to chemically caused stress cracking than that of the Structure II polycarbonate itself, and a single Tg (determined by differential scanning calorimetry).

For purposes of comparison, control films outside the scope of the invention were prepared as in Examples 4-6, except that Control A was composed of 100% of the Structure II polycarbonate, Control D was composed of 100% of the Structure (I) polyester employed in Examples 4-6, and Control C was composed of a 50:50 weight ratio blend of the Structure II polycarbonate and a polyester formed from 2,2-bis(4-hydroxyphenyl)propane and terephthalic:isophthalic acids (55:45 molar ratio) (a polyester sold under the trademark, Ardel D-100, by Amoco, Inc., USA). The Control C film had a hazy visual appearance (i.e., poor transparency) and exhibited two separate Tg's (determined by differential scanning calorimetry), which indicates that the polymers in the blend were incompatible and formed separate phases.

Relevant data is presented in Table II, below.

TABLE II

| Example | Weight Ratio (polyester:polycarbonate) | Tg('s) (°C.) |
|---|---|---|
| Control A | 0:100 | 228 |
| 4 | 25:75 | 207 |
| 5 | 50:50 | 187 |
| 6 | 75:25 | 170 |
| Control D | 100:0 | 154 |
| Control C | 50:50 | 196 and 224 |

EXAMPLES 7-9

Blends in accordance with the invention were prepared by thoroughly dissolving and mixing in dichloromethane 50 parts by weight of Structure (II) polycarbonate (prepared in accordance with Preparation 1, above), and 50 parts by weight of a polyester containing recurring units having Structure (I-A) and recurring units having Structure (I-B) (in Example 7 the polyester was that prepared in Preparation 5; in Example 8 the polyester was that prepared in Preparation 6; and in Example 9 the polyester was that prepared in Preparation 7, above), solvent casting the various solutions, and then drying off the solvent to yield free-standing films of the blends.

Each of the blends of Examples 7-9 exhibited good amorphousness and transparency, good impact resistance, better resistance to chemically caused stress cracking than that of the Structure II polycarbonate itself, and a single Tg (determined by differential scanning calorimetry).

Relevant data is presented in Table III, below.

TABLE III

| Example | Weight Ratio (polyester:polycarbonate) | Tg('s) (°C.) |
|---|---|---|
| 7 | 50:50 | 222 |
| 8 | 50:50 | 218 |
| 9 | 50:50 | 210 |

The invention has been described in detail with particular reference to certain preferred embodiments thereof, but it should be appreciated that variations and modifications can be effected within the spirit and scope of the invention.

What is claimed is:

1. A polymeric blend comprising a polyester and a polycarbonate, wherein:

the polyester contains recurring units having the structure

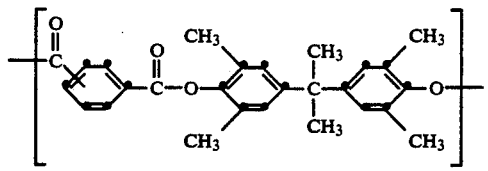

and the polycarbonate contains recurring units having the structure

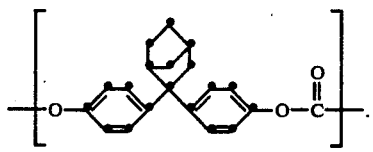

2. The polymeric blend of claim 1, wherein the polyester contains recurring units having the structure

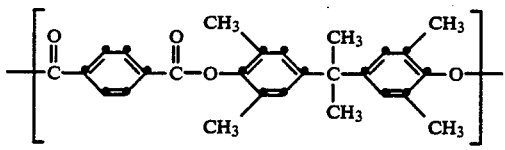

3. The polymeric blend of claim 1, wherein the polyester contains recurring units having the structure

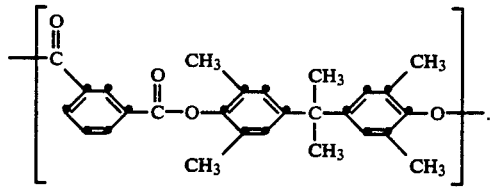

4. The polymeric blend of claim 1, wherein the polyester contains recurring units having the structure

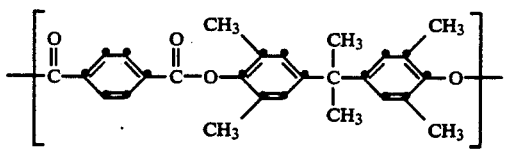

and recurring units having the structure

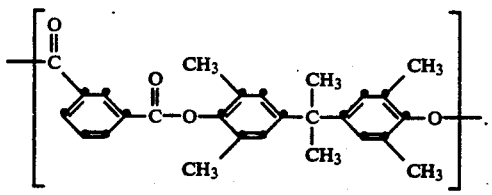

5. The polymeric blend of claim 1, wherein the polyester has a weight average molecular weight of from 10,000 to 200,000, and the polycarbonate has a weight average molecular weight of from 10,000 to 200,000.

6. The polymer blend of claim 1, having only a single glass transition temperature, that temperature being at least 154° C.

* * * * *

UNITED STATES PATENT AND TRADEMARK OFFICE
CERTIFICATE OF CORRECTION

PATENT NO. : 5,202,392
DATED : April 13, 1993
INVENTOR(S) : Hsinjin Yang and Paul Daniel Yacobucci It is certified that error appears in the above-indentified patent and that said Letters Patent is hereby corrected as shown below:

On the title page, item [75], "Daniel Y. Paul" should be --Paul Daniel Yacobucci--.

Signed and Sealed this

Fourth Day of January, 1994

Attest:

BRUCE LEHMAN

*Attesting Officer*     *Commissioner of Patents and Trademarks*